United States Patent [19]
Morimoto

[11] Patent Number: 6,108,280
[45] Date of Patent: Aug. 22, 2000

[54] OPTICAL INFORMATION STORAGE UNIT

[75] Inventor: Yasuaki Morimoto, Kawasaki, Japan

[73] Assignee: Fujitsu Ltd., Kawasaki, Japan

[21] Appl. No.: 09/107,844

[22] Filed: Jun. 30, 1998

[51] Int. Cl.$^7$ ............................... G11B 11/00; G11B 7/08
[52] U.S. Cl. .............................................. 369/13; 369/109
[58] Field of Search ............................ 369/13, 112, 109, 369/110, 44.37, 44.23, 120, 44.12, 119, 14, 118

[56] References Cited

U.S. PATENT DOCUMENTS

| | | | |
|---|---|---|---|
| 5,508,992 | 4/1996 | Hirose et al. | 369/109 |
| 5,831,942 | 11/1998 | Morimoto et al. | 369/13 |

FOREIGN PATENT DOCUMENTS

| | | |
|---|---|---|
| 61-90346 | 5/1986 | Japan . |
| 63-113838 | 5/1988 | Japan . |
| 1-229445 | 9/1989 | Japan . |
| 6-96466 | 4/1994 | Japan . |
| 8-7357 | 1/1996 | Japan . |
| 9-17003 | 1/1997 | Japan . |
| 9115185 | 5/1997 | Japan . |
| 9128825 | 5/1997 | Japan . |
| 9161347 | 6/1997 | Japan . |
| 9204700 | 8/1997 | Japan . |
| 9212870 | 8/1997 | Japan . |
| 9212928 | 8/1997 | Japan . |
| 9-282730 | 10/1997 | Japan . |

OTHER PUBLICATIONS

High Density Land & Groove Recording with Modified Optics and PA–MFM Recording; N. Aoyama, Y. Morimoto and T. Miyahara; *The Magnetics Society of Japan*; pp. 233–238; 1996.

*Primary Examiner*—Ali Neyzari
*Attorney, Agent, or Firm*—Greer, Burns & Crain, Ltd.

[57] ABSTRACT

An optical information storage unit for reproducing information recorded on a magneto-optic recording medium having a land and a groove as recording tracks, is provided with at least one of first and second systems, where the first system includes a ½ wave plate which is arranged so that a crystal optical axis of the ½ wave plate and an electrical vector of a light beam emitted from a light source forms approximately 45 degrees, where the ½ wave plate being removable from a position of the light beam, and the second system is arranged with the ½ wave plate so that the crystal optical axis of the ½ wave plate and the electrical vector of the light beam emitted from the light source forms approximately 45 degrees, where the ½ wave plate is movable so that another ½ wave plate can move to the position of the light beam so that a crystal optical axis of the other ½ wave plate is parallel to or perpendicular to the electrical vector. An electrical vector of the light beam irradiated on the magneto-optic recording medium is set so that the electrical vector is perpendicular to a direction in which a recorded signal flows when reproducing the signal from the land and is parallel to the direction in which the recorded signal flows when reproducing the signal from the groove.

13 Claims, 8 Drawing Sheets

⊛ MAGNETIC DOMAIN

OPTICAL INFORMATION STORAGE UNIT

BACKGROUND OF THE INVENTION

The present invention generally relates to optical information storage units, and more particularly to an optical information storage unit for reproducing a magneto-optic signal recorded on both a land and a groove of a magneto-optic recording medium.

In this specification, an "information storage unit" refers to an apparatus which records information on and/or reproduces information from a recording medium.

Presently, optical recording mediums are popularly used as recording mediums capable of enabling reproduction of audio signals and image signals therefrom. Particularly, active research and development are made with respect to magneto-optic recording mediums and phase change recording mediums, as rewritable high-density recording mediums.

Two techniques are conceivable in order to improve the recording density of the optical recording medium which records information spirally or concentrically, namely, reducing the track pitch and improving the linear recording density. In either case, the recording density can be improved by shortening the output wavelength of a semiconductor laser which is used for the recording and reproduction. However, a green or blue semiconductor laser which produces an output having a short wavelength and can continuously oscillate with stability at room temperature is unlikely to be put on the market at a low cost for still some considerable time. Under such circumstances, there are demands to realize a method of greatly improving the recording density by using the laser which produces an output having the presently available wavelength, such as a magnetic super resolution (MSR) proposed for the magneto-optic recording medium.

In the case of a RAM medium such as the magneto-optic recording medium, light having the same wavelength is used both at the time of recording information and at the time of reproducing information. On the other hand, in the case of a ROM medium which is prerecorded with information, phase pits are formed using a gas laser or the like which produces an output having a short wavelength. Hence, the reproducing conditions are the same for the RAM medium and the ROM medium, but the RAM medium is disadvantageous compared to the ROM medium from the point of view of recording the information with a high density, because the recording of the RAM medium requires a light source which will only be available in the future. For this reason, in the DVD standard to which much attention is drawn as a next-generation video recording medium for home use, no proposal has yet been made which would support the recording capacity of the ROM medium on the RAM medium having the same medium size as the ROM medium.

If the same linear recording density and the same track pitch are used, it is possible to simply double the recording density by recording the information on both the land and the groove as compared to the case where the information is recorded only on one of the land and the groove. Hence, the method of recording the information on both the land and the groove is an extremely important method from the point of view of developing a high-density recording medium. It has been reported for the magneto-optic recording medium that the MSR described above can not only improve the linear recording density but also reduce crosstalk between the tracks, and various studies are being made on the possibility of applying the MSR to the information recording on both the land and the groove. However, the condition for realizing the MSR is complicated in that, for example, the reproducing laser power depends upon the linear velocity, a reproducing magnetic field is required in some cases, and at least three magnetic layers are required in some cases. Therefore, the MSR is uncertain as to the stability, and the realization is likely to increase the cost of the apparatus.

When the track pitch is reduced, the crosstalk caused by the mixing of a data signal from the adjacent region into the output signal becomes a problem. According to the conventional method which records the information on the land or records the information on the groove, the groove exists between two adjacent recorded lands or, the land exists between two adjacent recorded grooves. As a result, the adjacent regions recorded with the information are separated by a groove or a land, thereby suppressing the crosstalk. However, when recording the information on both the land and the groove, the regions recorded with the information are adjacent to each other, and the effect of the crosstalk on the reproducing characteristic is extremely large. A Japanese Laid-Open Patent Application No. 8-7353 proposes selection of the depth of the groove so as to reduce the crosstalk from the land or the groove. According to this proposed method, in a case where the wavelength of the light is 680 nm, the numerical aperture of an objective lens used is 0.55 and the widths of the land and the groove are 0.7 µm, the crosstalk is reduced by setting the depth of the groove to approximately ⅙ the wavelength.

But even if the spot size of the light irradiated on the magneto-optic recording medium is the same, as the track pitch becomes narrower, there was a problem in that the crosstalk cannot be reduced sufficiently in the case of a groove having the depth on the order of approximately ⅙ the wavelength. In addition, compared to the normal case where the depth of the groove of the magneto-optic recording medium is ⅛ the wavelength, there also were problems in that a carrier level of the signal decreases and a level of a push-pull signal which is used as a tracking error signal also decreases in the case of the groove having the depth on the order of approximately ⅙ the wavelength.

On the other hand, it has been reported that the condition for reducing the crosstalk in the proposed method, that is, the setting of the depth of the groove of the magneto-optic recording medium, easily changes depending on the Kerr ellipticity, spherical aberration and focus error of the objective lens, and the like.

SUMMARY OF THE INVENTION

Accordingly, it is a general object of the present invention to provide a novel and useful optical information storage unit in which the problems described above are eliminated.

Another and more specific object of the present invention is to provide an improved optical information storage unit which can reproduce with stability a signal recorded on a land and a groove of a magneto-optic recording medium without putting a special load on the magneto-optic recording medium.

Still another object of the present invention is to provide an optical information storage unit for reproducing information recorded on a magneto-optic recording medium having a land and a groove as recording tracks, comprising an optical system including a ½ wave plate which is arranged so that a crystal optical axis of the ½ wave plate and an electrical vector of a light beam emitted from a light source forms approximately 45 degrees, the ½ wave plate being removable from a position of the light beam, where an electrical vector of the light beam irradiated on the magneto-optic recording medium is set so that the electrical vector is perpendicular to a direction in which a recorded signal flows when reproducing the signal from the land and is parallel to the direction in which the recorded signal flows when reproducing the signal from the groove. According to the optical information storage unit of the present invention, it is possible to realize an optimum phase compensation with respect to both the land and the groove by using the optical information recording and reproducing apparatus according to the present invention. In addition, when two independent optical information detecting optical systems with phase compensation conditions which are optimized with respect to the land and the groove are used, the crosstalk caused by the signal from the adjacent groove or land does not fall within the phase compensation conditions and the signal amplitude from the adjacent groove or land is reduced thereby. Therefore, by using the optical information recording and reproducing apparatus of the present invention, it is possible to obtain a great effect of reducing the crosstalk. Moreover, it is possible to use a simple construction to realize the particular method of controlling the plane of polarization or the switching of the magneto-optic signal detecting optical system for the land or the groove.

A further object of the present invention is to provide an optical information storage unit for reproducing information recorded on a magneto-optic recording medium having a land and a groove as recording tracks, comprising an optical system including a ½ wave plate which is arranged so that a crystal optical axis of the ½ wave plate and an electrical vector of a light beam emitted from a light source forms approximately 45 degrees, where the ½ wave plate being movable so that another ½ wave late can move to the position of the light so that a crystal optical axis of the other ½ wave plate is parallel to or perpendicular to the electrical vector, and an electrical vector of the light beam irradiated on the magneto-optic recording medium is set so that the electrical vector is perpendicular to a direction in which a recorded signal flows when reproducing the signal from the land and is parallel to the direction in which the recorded signal flows when reproducing the signal from the groove. According to the optical information storage unit of the present invention, it is possible to realize an optimum phase compensation with respect to both the land and the groove by using the optical information recording and reproducing apparatus according to the present invention. In addition, when two independent optical information detecting optical systems with phase compensation conditions which are optimized with respect to the land and the groove are used, the crosstalk caused by the signal from the adjacent groove or land does not fall within the phase compensation conditions and the signal amplitude from the adjacent groove or land is reduced thereby. Therefore, by using the optical information recording and reproducing apparatus of the present invention, it is possible to obtain a great effect of reducing the crosstalk. Moreover, it is possible to use a simple construction to realize the particular method of controlling the plane of polarization or the switching of the magneto-optic signal detecting optical system for the land or the groove.

Another object of the present invention is to provide an optical information storage unit for reproducing information recorded on a magneto-optic recording medium having a land and a groove as recording tracks, comprising at least one of first means and second means, where the first means includes a ½ wave plate which is arranged so that a crystal optical axis of the ½ wave plate and an electrical vector of a light beam emitted from a light source forms approximately 45 degrees, the ½ wave plate is removable from a position of the light beam, the second means is arranged with the ½ wave plate so that the crystal optical axis of the ½ wave plate and the electrical vector of the light beam emitted from the light source forms approximately 45 degrees, the ½ wave plate is movable so that another ½ wave plate can move to the position of the light beam so that a crystal optical axis of the other ½ wave plate is parallel to or perpendicular to the electrical vector, and an electrical vector of the light beam irradiated on the magneto-optic recording medium is set so that the electrical vector is perpendicular to a direction in which a recorded signal flows when reproducing the signal from the land and is parallel to the direction in which the recorded signal flows when reproducing the signal from the groove. According to the optical information storage unit of the present invention, it is possible to realize an optimum phase compensation with respect to both the land and the groove by using the optical information recording and reproducing apparatus according to the present invention. In addition, when two independent optical information detecting optical systems with phase compensation conditions which are optimized with respect to the land and the groove are used, the crosstalk caused by the signal from the adjacent groove or land does not fall within the phase compensation conditions and the signal amplitude from the adjacent groove or land is reduced thereby. Therefore, by using the optical information recording and reproducing apparatus of the present invention, it is possible to obtain a great effect of reducing the crosstalk. Moreover, it is possible to use a simple construction to realize the particular method of controlling the plane of polarization or the switching of the magneto-optic signal detecting optical system for the land or the groove.

Other objects and further features of the present invention will be apparent from the following detailed description when read in conjunction with the accompanying drawings.

DETAILED DESCRIPTION OF THE PREFERRED EMBODIMENTS

First, a description will be given of the operating principle of the present invention.

In the present invention, directions of electrical vectors of laser beams irradiated on a magneto-optic recording medium as linearly polarized light beams are mutually perpendicular when reproducing a magneto-optic signal recorded on a land and when reproducing a magneto-optic signal recorded on a groove of the magneto-optic recording medium. Two optical systems are provided to detect the magneto-optic signals by the magnetic Kerr effects. In the two optical systems, the electrical vector of the laser beam is perpendicular to a direction in which the recorded signal flows when reproducing the signal from the land, and the electrical vector of the laser beam is parallel to the direction in which the recorded signal flows when reproducing the signal from the groove. The two optical systems have means for giving mutually different phase compensation quantities, and one optical system detects the signal from the land or the groove. Particularly, it is important that the polarization control of the laser beam irradiated upon signal reproduction can easily be made.

According to one aspect of the present invention, when reproducing the magneto-optic signal recorded on the land or the groove of the magneto-optic recording medium, the state of the electrical vector of the laser beam which is irradiated on the magneto-optic recording medium for the signal reproduction from the land or the groove is prescribed, and two basic methods of realization are indicated.

According to another aspect of the present invention, a one-dimensional or a two-dimensional actuator using a magnet and an actuator is provided as a movable means, and a ½ wave plate is arranged insertable or removable so that the electrical vector of the irradiating light beam forms 45 degrees with respect to a crystal optical axis of the ½ wave plate, so that the direction of the electrical vector of the irradiating light beam can be switched.

In addition, according to another aspect of the present invention, a mechanism for making the electrical vector of the irradiating light beam form 45 degrees with respect to and parallel to the crystal optical axis of the ½ wave plate are realized, so that as a result, the direction of the electrical vector of the irradiating light beam can be switched.

Furthermore, according to still another aspect of the present invention, measures for further improving the signal quality are proposed. In other words, when reproducing the signal recorded on the land, the ½ wave plate which is provided as a means of giving a phase difference and arranged in one optical system is rotated and inclined with respect to the light beam, so as to carry out an optimum phase compensation, and to make an adjustment so that a time jitter in the reproduced signal becomes a minimum. In addition, when reproducing the signal recorded on the groove, the ½ wave plate which is provided as a means of giving a phase difference and arranged in the other optical system is rotated and inclined with respect to the light beam, so as to carry out an optimum phase compensation, and to make an adjustment so that the time jitter in the reproduced signal becomes a minimum. As described above, there is provided a mechanism which can switch the direction of the electrical vector of the laser beam irradiated on the magneto-optic recording medium upon signal reproduction depending on whether the signal is reproduced from the land or the groove, and different phase differences are set in the two optical systems so as to optimize the phase compensation with respect to the land or the groove.

Therefore, although the present invention employs a relatively simple method, it is possible to sufficiently suppress the crosstalk between the tracks, that is, the land and the groove of the magneto-optic recording medium, as compared to the conventional method, and a stable signal reproduction can be made. Hence, it is possible to reproduce the signals recorded on both the land and the groove of the magneto-optic recording medium with a high quality.

A detailed description will hereinafter be given of an embodiment of the optical information storage unit according to the present invention, by referring to FIGS. 1 through 8.

Figure 1:
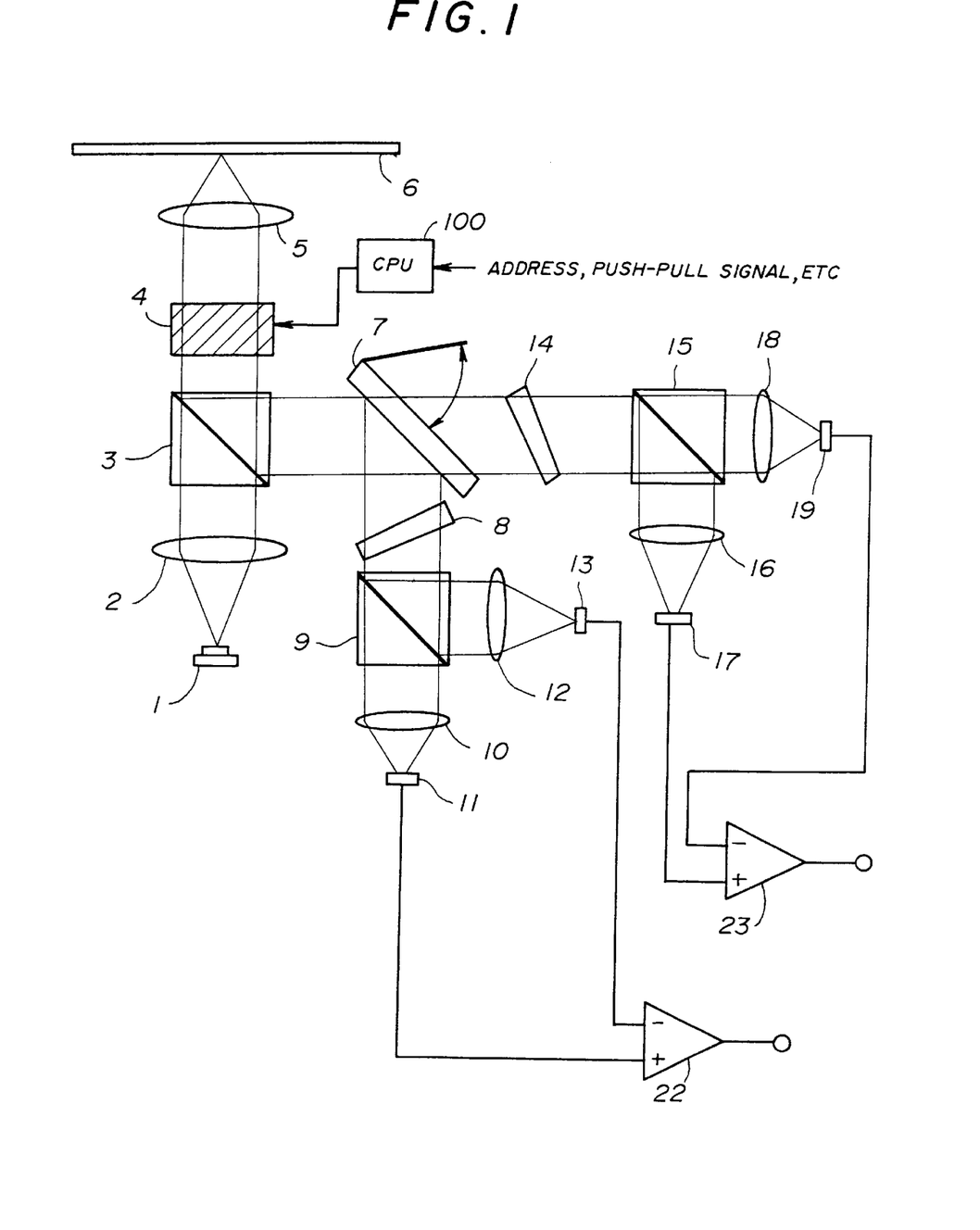
FIG. 1 is a diagram showing the basic construction of an embodiment of an optical information storage unit according to the present invention.

FIG. 1 is a diagram showing the basic construction of an optical system of an embodiment of optical information storage unit according to the present invention. A laser beam emitted from a semiconductor laser 1 and having a wavelength 680 nm is converted into parallel light by a collimator lens 2, and is supplied to an electrical vector control mechanism 4 via a polarization beam splitter 3. This polarization beam splitter 3 has transmitting and reflecting characteristics such that transmittances Tp and Ts of the polarization beam splitter 3 with respect to p-polarized light component and s-polarized light component and reflectivities Rp and Rs of the polarization beam splitter 3 with respect to the p-polarized light component and the s-polarized light component are respectively set to satisfy Tp:Rp=80:20 and Ts:Rs=2:98.

Figure 2:
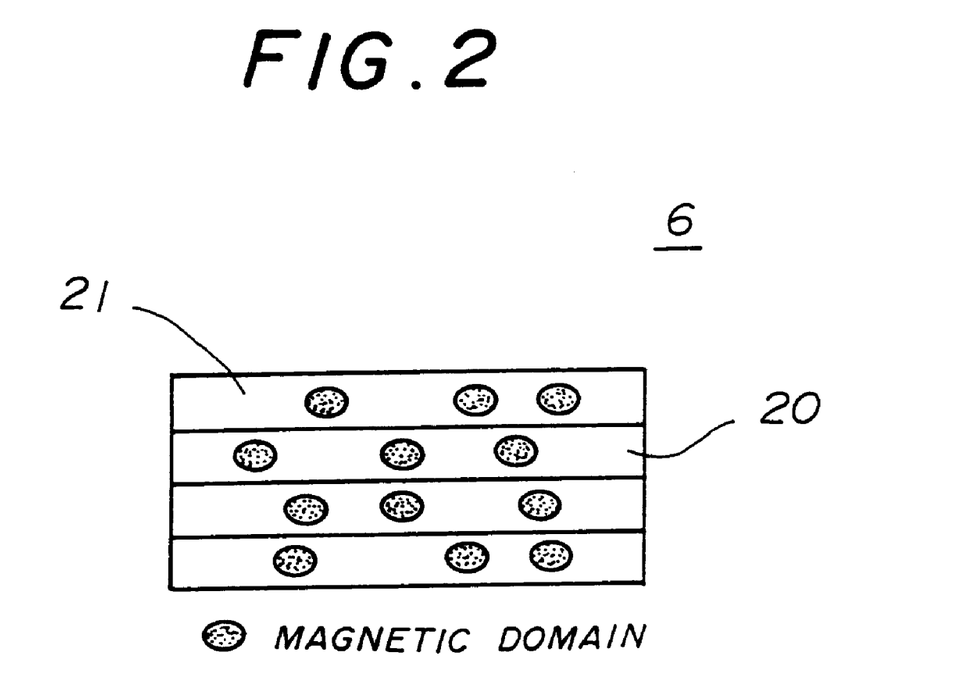
FIG. 2 is a plan view showing a part of a magneto-optic recording medium on an enlarged scale.

The electrical vector control mechanism 4 controls the polarization depending on whether a signal is reproduced from a land 21 or a groove 20 of a magneto-optic recording medium 6 shown in FIG. 2 is reproduced. FIG. 2 is a plan view showing a part of the land and the groove of the magneto-optic recording medium 6 on an enlarged scale. For example, the magneto-optic recording medium 6 is a magneto-optic disk. A central processing unit (CPU) 100 discriminates whether a track being reproduced is formed in the land 21 or the groove 20 of the magneto-optic recording medium 6, based on an address on the magneto-optic recording medium, a polarity of a push-pull signal, or the like. Based on this discrimination, the CPU 100 controls the polarization to be carried out in the electrical vector control mechanism 4 depending on whether the signal reproduction is made from the land 21 or the groove 20.

Next, the light beam subjected to the polarization control in the electrical vector control mechanism 4 is converged to a diffraction limit by an objective lens 5 having a numerical aperture (NA) of 0.55 and is irradiated on the magneto-optic recording medium 6. The electrical vector of the laser beam irradiated on the magneto-optic recording medium 6 is set parallel to a direction in which the recorded signal flows by the operation of the electrical vector control mechanism 4 when reproducing the magneto-optic signal recorded on the groove 20. In addition, the electrical vector of the laser beam irradiated on the magneto-optic recording medium 6 is set perpendicular to the direction in which the recorded signal flows by the operation of the electrical vector control mechanism 4 when reproducing the magneto-optic signal recorded on the land 21.

The light beam reflected by the groove 20 or the land 21 is subjected to a polarization control similar to that when irradiating the light on the magneto-optic recording medium 6, by the operation of the objective lens 5 and the electrical vector control mechanism 4, and is then subjected to an amplitude division in the polarization beam splitter 3 where the light is separated into a transmitting component and a reflected component which is reflected by a reflection surface of the polarization beam splitter 3.

Two states are set with respect to the reflected component, namely, a state where all of the light beam advances straight and a state where the light beam is reflected, by the operation of a movable mirror 7 which includes a magnet, an electromagnetic coil, a support and a total reflection mirror. By use of the movable mirror 7, it is possible to carry out a high-quality signal reproduction which is improved by approximately 3 dB in terms of the signal-to-noise ratio as compared to the case where a semitransparent mirror is used to constantly carry out the amplitude division.

When the movable mirror 7 is tilted downwards, the light beam is reflected by the movable mirror 7. The reflected light beam corresponds to the detected magneto-optic signal recorded on the groove 20, and in order to give an optical phase difference, the reflected light beam is passed through a ½ wave plate 8 which is inclined with respect to the light beam so as to carry out a phase compensation, and is then separated by a polarization beam splitter 9 into a p-polarized light component which is transmitted and a s-polarized light component which is reflected.

The p-polarized light component and the s-polarized light component are respectively converged on photodetectors 11 and 13 via corresponding convergent lenses 10 and 12. After photoelectric conversions made in the photodetectors 11 and 13, a differential amplifier 22 reproduces the magneto-optic recorded on the groove 20 based on outputs of the photodetectors 11 and 13.

On the other hand, when the movable mirror 7 is tilted upwards, the light beam passes through as it is. The light beam passing through as it is corresponds to the detected magneto-optic signal recorded on the land 21, and in order to give an optical phase difference which is different from that used with respect to the signal reproduction from the groove 20, the light beam is passed through a ½ wave plate 14 which is inclined with respect to the light beam so as to carry out a phase compensation.

An angle formed by an electrical vector of the light incident to the ½ wave plate 14 and a crystal optical axis of the ½ wave plate 14 is different from an angle formed by an electrical vector of the light incident to the ½ wave plate 8 and a crystal optical axis of the ½ wave plate 8.

The light passed through the ½ wave plate 14 is then separated by a polarization beam splitter 15 into a p-polarized light component which is transmitted and a s-polarized light component which is reflected. The p-polarized light component and the s-polarized light component are respectively converged on photodetectors 17 and 19 via corresponding convergent lenses 16 and 18. After the photoelectric conversions made in the photodetectors 17 and 19, a differential amplifier 23 reproduces the magneto-optic recorded on the land 21 based on outputs of the photodetectors 17 and 19.

Figure 3A:
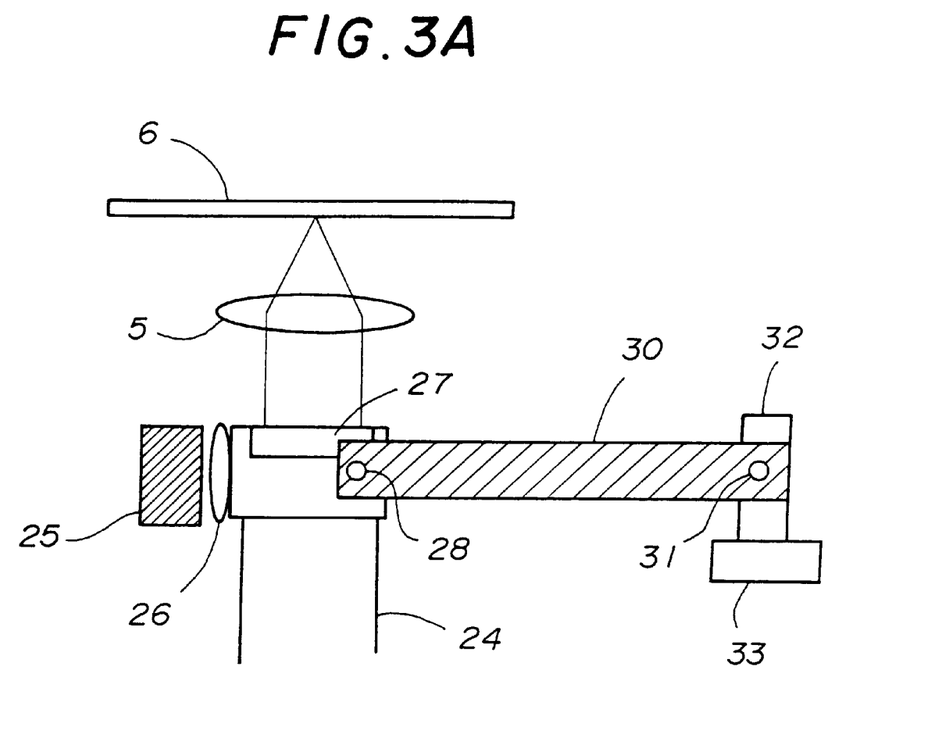
FIGS. 3A and 3B respectively are a cross sectional view and a plan view showing the general construction of a one-dimensional actuator related to an electrical vector control mechanism.
Figure 3B:
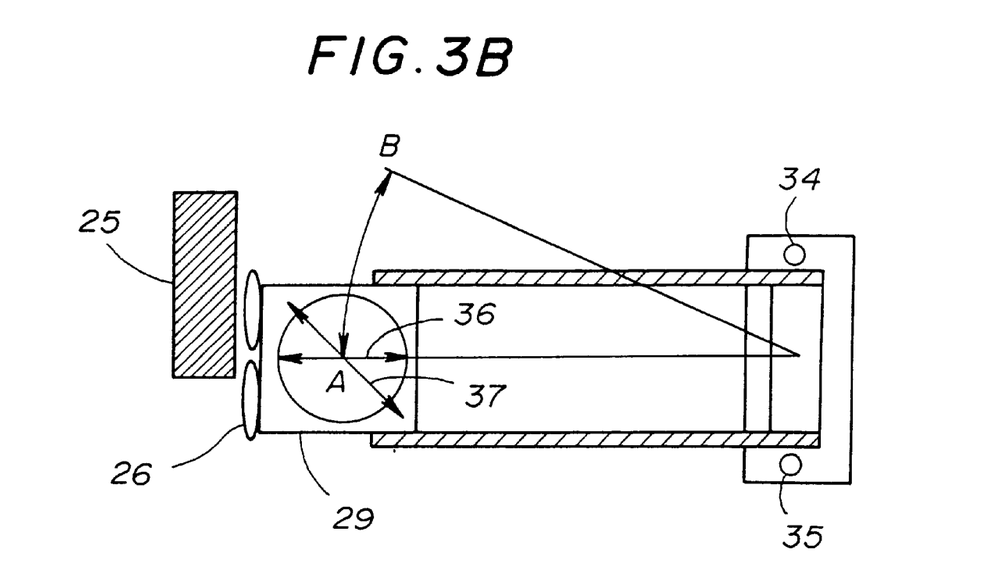

Next, a more detailed description will be given of the electrical vector control mechanism 4 which forms an important part of the optical information storage unit according to the present invention. FIGS. 3A and 3B show an embodiment of the electrical vector control mechanism 4 using a one-dimensional actuator.

FIG. 3A shows a general cross section of this embodiment, and FIG. 3B shows a general plan view of this embodiment. In this one-dimensional actuator, a support 32 is mounted on a base 33 which is fixed by securing parts 34 and 35, and a leaf spring 30 is fixed on the support 32 by a securing part 31. A holder 29 having a penetration hole is fixed on the leaf spring by a securing part 28. In addition, an electromagnetic coil 26 is fixed on the holder 29, and the holder 29 is movable between a position A and a position B by electromagnetic mutual action of the electromagnetic coil 26 and a magnet 25 which has an offset arrangement in a moving direction and by a force of the leaf spring 30.

A crystal optical axis 37 of the ½ wave plate 27 which is fixed on the holder 29 forms 45 degrees with respect to an electrical vector 36 of a light beam 24 transmitted through the ½ wave plate 27 when the holder 29 is located at the position A. In this state, the electrical vectors of the light beam before transmission and the light beam after transmission are perpendicular to each other by the function of the ½ wave plate 27.

When the holder 29 moves to the position B, the light beam 24 will not be transmitted through the ½ wave plate 24 but will pass through as it is. In other words, the plane of polarization of the light beam 24 is maintained.

By using the one-dimensional actuator described above, it is possible to easily control the electrical vector of the light beam irradiated on the magneto-optic recording medium 6 depending on whether the signal is to be reproduced from the land 21 or the groove 20.

Figure 4A:
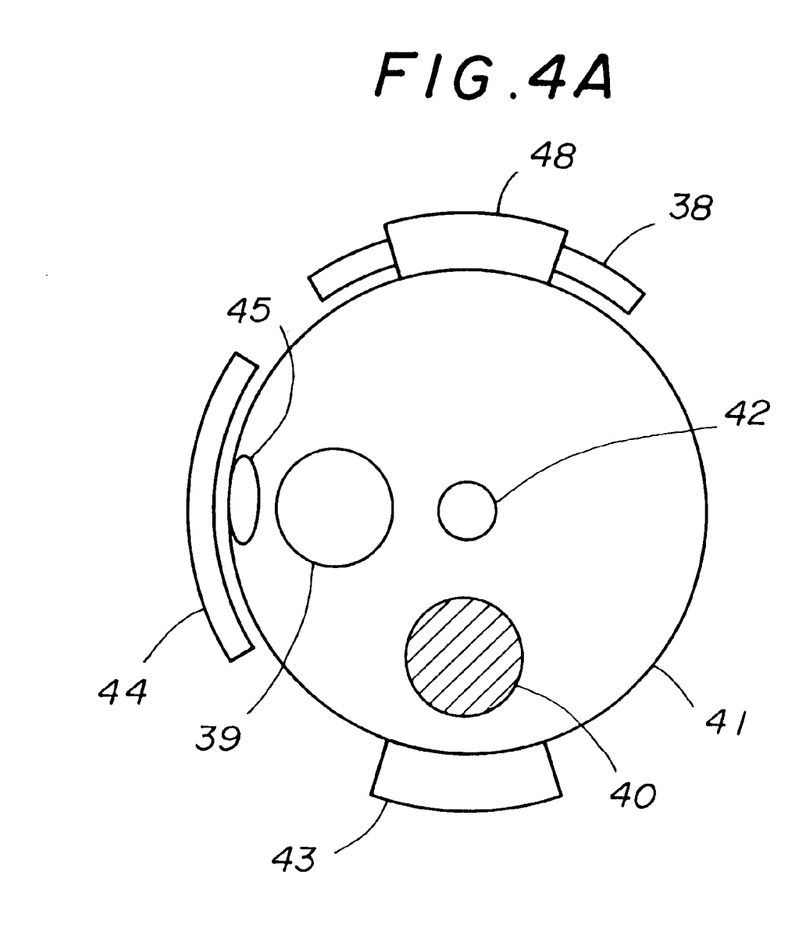
FIGS. 4A and 4B respectively are a plan view and a left side view showing the general construction of a two-dimensional actuator related to the electrical vector control mechanism.
Figure 4B:
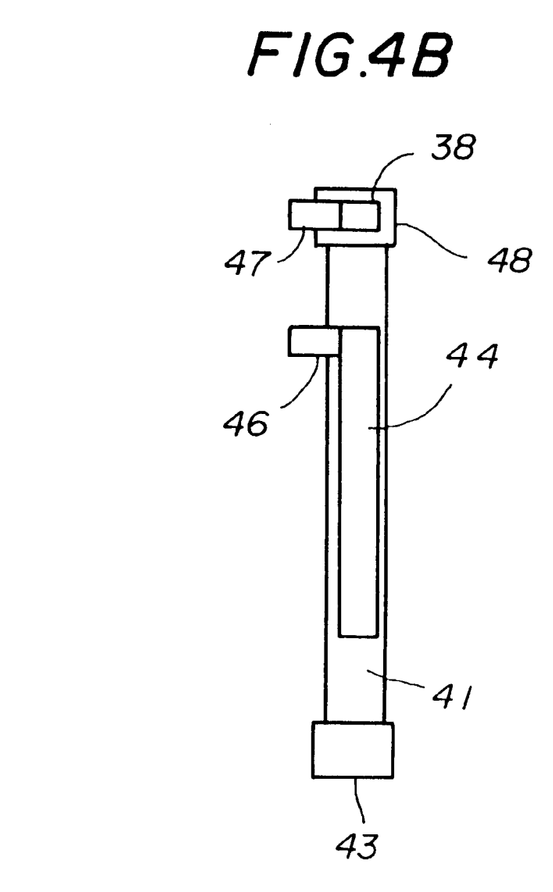

FIGS. 4A and 4B show another embodiment of the electrical vector control mechanism 4 using a rotary sliding type two-dimensional actuator. FIG. 4A shows a general plan view of this embodiment, and FIG. 4B shows a general left side view of this embodiment.

In this two-dimensional actuator, a holder 41 is supported on a support pole 42 which supports the sliding and rotation. A ½ wave plate 39 is fixed at a part of the holder 41 provided with a penetration hole. In addition, another penetration hole 40 is provided in this embodiment, and the ½ wave plate is located at this position. A magnetic piece 45 is inserted at an outer peripheral part of the holder 41 along a straight line connecting the support pole 42 and the ½ wave plate 39. An electromagnetic coil 48 is fixed on the holder 41 at a position rotated by 90 degrees about the support pole 42 with respect to the magnetic piece 45. In addition, an electromagnetic coil 43 is fixed at a position confronting the electromagnetic coil 48. A magnet 44 is fixed by a support part 46, independently of the holder 41. A magnet 38 is fixed by a support part 46 at a position rotated by 90 degrees about the support pole 42 with respect to the magnet 44, independently of the holder 41.

Figure 5A:
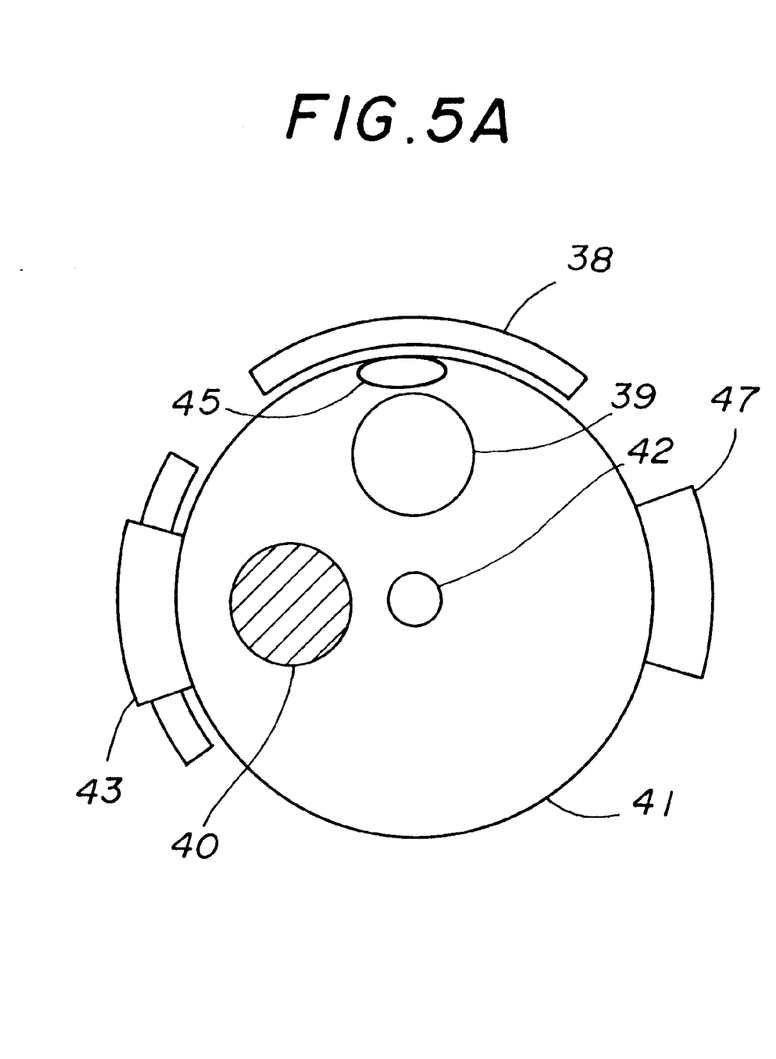
FIGS. 5A and 5B respectively are a plan view and a left side view showing the two-dimensional actuator shown in FIGS. 4A and 4B in another position.
Figure 5B:
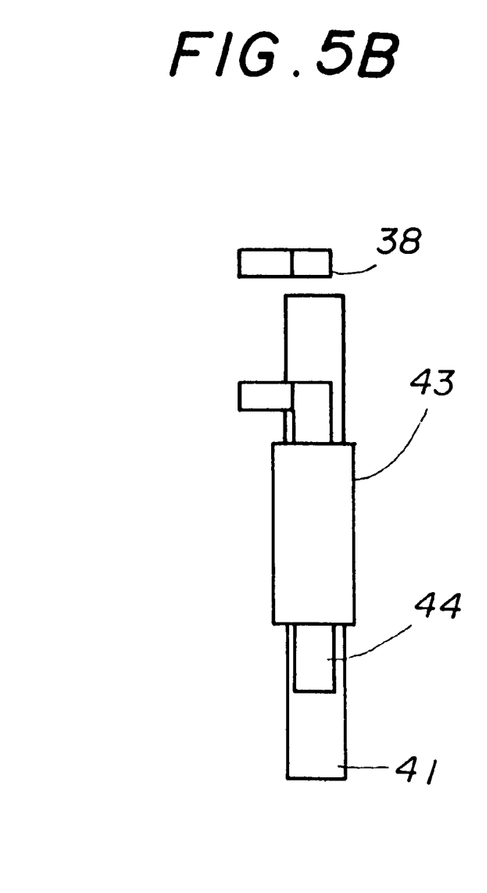

A description will now be given of the operation of the rotary sliding type two-dimensional actuator having the construction described above. A current is applied to the electromagnetic coil 48 in a direction such that the holder 41 turns clockwise. In this state, the magnetic piece 45 is attracted by the magnet 44, and acts so as to return the holder 41 to its original position. On the other hand, the clockwise turn of the holder 41 is increased by increasing the current applied to the electromagnetic coil 48. When the current applied to the electromagnetic coil 48 is further increased, the attracting force acting between the magnetic piece 45 and the magnet 44 decreases, and the holder 41 shifts to a position where the magnetic piece 45 is located in a vicinity of the position shown in FIG. 5A by the attracting force of the magnet 38, to thereby assume a pendulum-like state. FIG. 5B shows a general left side view of the rotary sliding type two-dimensional actuator which is in the state shown in FIG. 5A.

At the same time, the electromagnetic coil 48 moves to a position which is virtually unaffected by the attracting force of the magnet 38. Actually, since the electromagnetic coil 43 which is fixed to the holder 41 is received by the support part 46, the control is unaffected even if the current is further applied to the electromagnetic coil 48. In this state, the magnetic piece 45 stops at a stable position by the attracting force of the magnet 38 when the current applied to the electromagnetic coil 48 is stopped.

Hence, the ½ wave plate 39 rotates from its original position to a position rotated by 90 degrees as shown in FIG. 5A. In addition, the penetration hole 40 moves to a position where the ½ wave plate 39 was located. Further, when the state is returned from the state shown in FIG. 5A to the state shown in FIG. 4A, a current is applied to the electromagnetic coil 43 in a direction such that the holder 41 turns counter-clockwise.

Next, a description will be given of the relationship between the crystal optical axis of the ½ wave plate 39 and the electrical vector of the laser beam. In the state shown in FIG. 4A, the crystal optical axis and the electrical vector of the laser beam form 45 degrees to each other, and the electrical vectors of the light beam before transmission and the light beam after the transmission through the ½ wave plate 39 are perpendicular to each other. In addition, since the laser beam passes through the penetration hole 40 as it is in the state shown in FIG. 5A, the plane of polarization will not rotate. Alternatively, in the state shown in FIG. 5A, another ½ wave plate exists at the penetration hole 40, the plane of polarization will also not rotate if the crystal optical axis of this other ½ wave plate is parallel to or perpendicular to the electrical vector of the laser beam incident to this other ½ wave plate.

By controlling the plane of polarization in the above described manner, it is possible to reproduce the magneto-optic signal recorded on the land 21 and the groove 20 with a high quality, by irradiating the laser beam on the magneto-optic recording medium 6 so that the electrical vector is perpendicular to a direction in which the recorded signal flows when reproducing the signal from the land 21, and so that the electrical vector is parallel to the direction in which the recorded signal flows when reproducing the signal from the groove 20.

Figure 6:
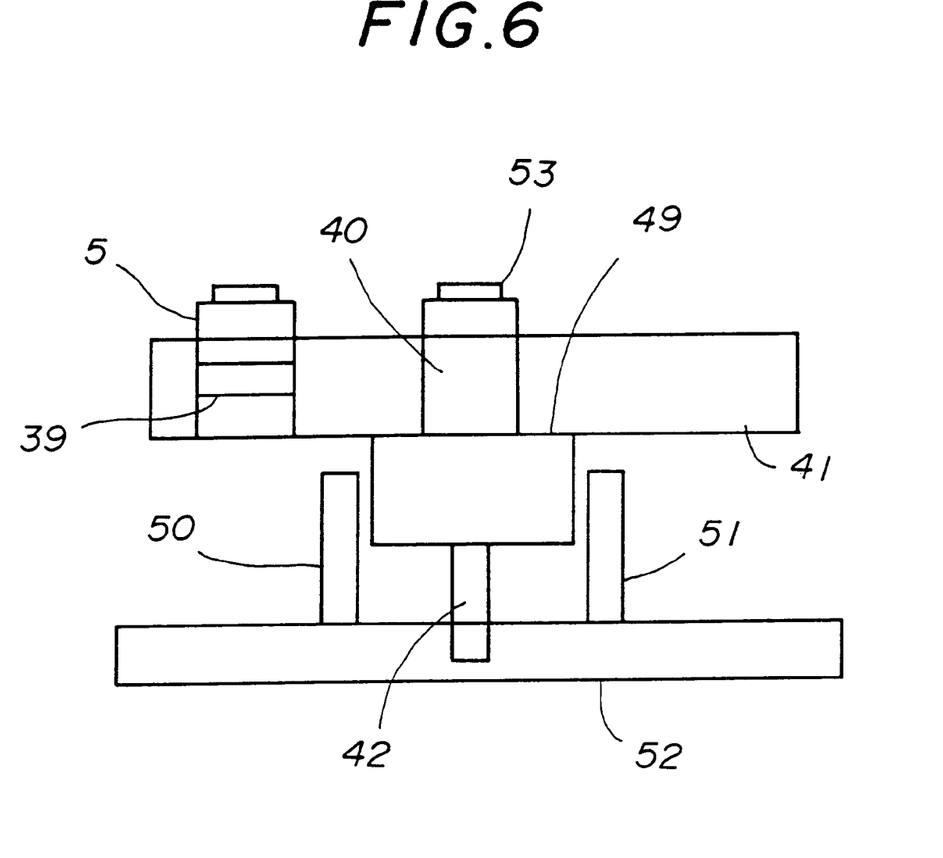
FIG. 6 is a diagram showing the structure related to focusing when the electrical vector control mechanism using the two-dimensional actuator is also used for control of an objective lens.

A description will be given of a further embodiment of the electrical vector control mechanism 4. In this embodiment, the rotary sliding type two-dimensional actuator described above is used for the control of the plane of polarization and for the focus and tracking control of an objective lens. The basic construction related to a focus direction drive is shown in FIG. 6.

Basically, up and down and rotary operations are possible. For example, a focus electromagnetic coil 49 is fixed on the holder 41 so as to surround the support pole 42, and magnets 50 and 51 are fixed on a base 52 about the support pole 42, where the base 52 is fixed on the support pole 42. In the rotary sliding type two-dimensional actuator having this construction, the objective lens 5 is arranged at the position where the ½ wave plate 39 is arranged, and an objective lens 53 is arranged at the position of the penetration hole 40. The tracking is carried out by controlling the objective lens 5 by the magnet 38 and the electromagnetic coil 48 shown in FIGS. 4A through 5B, and the tracking control is carried out by the electromagnetic coil 43 and the magnet 44 when a reproducing objective lens is switched from the objective lens 5 to the objective lens 53.

Next, a description will be given of the specifications of the magneto-optic recording medium which is used in the optical information storage unit according to the present invention to record the information on and reproduce the information from both the land and the groove.

A polycarbonate substrate having a land width and a groove width of approximately the same width of 0.7 μm were used. An optical phase difference between the land surface and the groove surface of the polycarbonate substrate is approximately ⅛ the wavelength (laser wavelength of 680 nm), and SiN having a thickness of 90 nm was sputtered on this polycarbonate substrate. Then, a TbFeCo layer of 20 nm, a SiN layer of 22 nm, and an Al layer of 65 nm which becomes a reflection layer were successively formed. Further, a UV resin layer of approximately 10 μm was spin-coated as a protection layer.

A description will now be given of the method of recording the magneto-optic signal on the land and the groove of the magneto-optic recording medium. In this embodiment of the present invention, a light pulse synchronized to a clock was irradiated on the magnet-optic recording medium, and a pulse assisted electromagnetic modulation system was used which applies an alternating magnetic field modulated by a RLL1-7 code. The results of the reproducing characteristic obtained by this embodiment of the optical information storage unit according to the present invention will be described hereafter.

Figure 7:
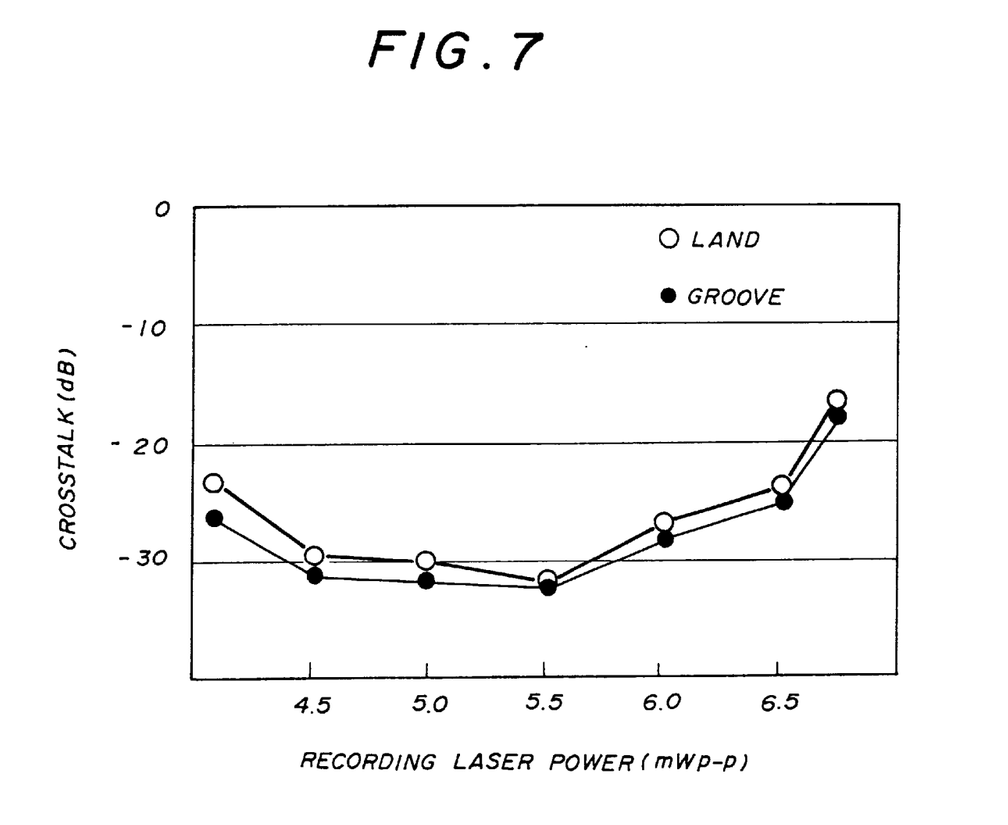
FIG. 7 is a diagram showing measured results of a recording laser power dependency of a crosstalk from an adjacent track.

FIG. 7 is a diagram showing measured results of a recording laser power dependency of a crosstalk from an adjacent track. In other words, FIG. 7 shows the dependency of the crosstalk between the land and the groove with respect to the peak power of the recording laser pulse. Magnetic domains, that is, marks having a mark length of 2 μm, were recorded on the land or the groove, and a carrier level Cm was measured. In addition, the groove or the land which is adjacent to the above described land or the groove was reproduced and a carrier level Camax was measured, and then a crosstalk Ct=Camax−Cm was obtained by denoting the higher carrier level by Camax. Hence, a carrier level obtained by directly reproducing the signal recorded on the land or the groove was subtracted from a carrier level obtained by reproducing the unrecorded land or the unrecorded groove.

In FIG. 7, a white circular mark indicates the crosstalk from the land, and a black circular mark indicates the crosstalk from the groove. It may be seen from FIG. 7 that the crosstalk caused by the signal recorded on the land or the groove shows a value of −25 dB or less with respect to either case for a large recording laser power range.

Figure 8:
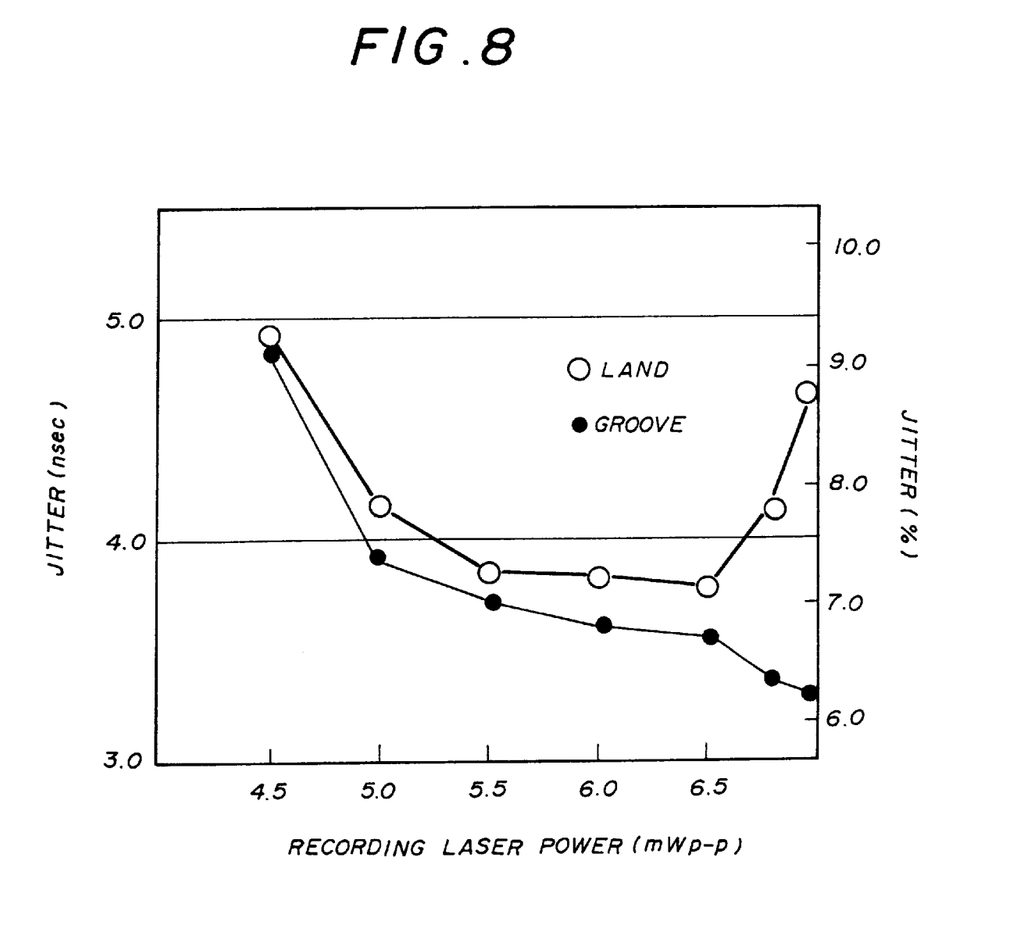
FIG. 8 is a diagram showing measured results of a recording laser power dependency of a 2 T jitter.

FIG. 8 is diagram showing measured results of a recording laser power dependency of a 2 T jitter. The results shown in FIG. 8 were obtained by recording a random signal having a length 2 T=0.48 μm which is a minimum mark length in the RLL1-7 (RLL: Run Length Limited) code on the magneto-optic recording medium at a linear velocity of 4.5 m/s according to the pulse assisted magnetic field modulation system and then reproducing the random signal at a reproducing laser power of 1.3 mW.

In FIG. 8, a white circular mark indicates the jitter from the land, and a black circular mark indicates the jitter from the groove. The jitter in this case is defined as a value (%) which is obtained by multiplying 100 to a ratio of a standard deviation σ2 T of the 2 T signal with respect to a predetermined window width (time). In addition, the reproducing laser power refers to the laser power when the light is output from the objective lens.

As may be seen from FIG. 8, when the signal was recorded on both the land and the groove of the magneto-optic recording medium and then reproduced, it was confirmed that the jitter is 9% or less in a wide recording laser power range and that a large margin can be secured with respect to the jitter. Generally, if an average jitter between a clock and the data is 10% or less, it is judged that the jitter is within a sufficiently tolerable range for the data recording and reproduction. In this embodiment, even though the evaluation is made with respect to the jitter of 2 T which is the minimum mark length, a satisfactory result in which the jitter is 9% or less was obtained, and it was therefore confirmed that the data recording and reproduction are completely unaffected by the jitter from the practical point of view.

When the conventional optical information storage unit is used, that is, when the signal is reproduced from the land or the groove and no phase compensation described above is made, it was impossible to achieve a jitter of 10% or less in any laser power range. In addition, when the orientation of the ½ wave plate is not adjusted and optimized for each of the land and the groove, the crosstalk reduction and the improvement of the reproduced signal intensity become difficult, and it was similarly impossible to realize the jitter of 10% or less.

Therefore, according to the present invention, it is possible to realize an optimum phase compensation with respect to both the land and the groove by using the optical information recording and reproducing apparatus according to the present invention. By using two independent optical information detecting optical systems with phase compensation conditions which are optimized with respect to the land and the groove, the crosstalk caused by the signal from the adjacent groove or land does not fall within the phase compensation conditions and the signal amplitude from the adjacent groove or land is reduced thereby. Therefore, by using the optical information recording and reproducing apparatus of the present invention, it is possible to obtain a great effect of reducing the crosstalk.

Moreover, it is possible to use a simple construction to realize the particular method of controlling the plane of polarization or the switching of the magneto-optic signal detecting optical system for the land or the groove.

Further, the present invention is not limited to these embodiments, and various variations and modifications may be made without departing from the scope of the present invention.

What is claimed is:

1. An optical information storage unit for reproducing information recorded on a magneto-optic recording medium having a land and a groove as recording tracks, comprising:

an optical system including a ½ wave plate which is arranged so that a crystal optical axis of the ½ wave plate and an electrical vector of a light beam emitted from a light source forms approximately 45 degrees, said ½ wave plate being removable from a position of the light beam;

an electrical vector of the light beam irradiated on the magneto-optic recording medium being set so that the electrical vector is perpendicular to a direction in which a recorded signal flows when reproducing the signal from the land and is parallel to the direction in which the recorded signal flows when reproducing the signal from the groove.

2. The optical information storage unit as claimed in claim 1, wherein the ½ wave plate of said optical system is fixed on a uniaxial actuator comprising a magnet and an electromagnetic coil, and said magnet has an offset arrangement with respect to the electromagnetic coil in a direction in which a moving part of the actuator moves, so as to be movable approximately perpendicularly to the light beam.

3. The optical information storage unit as claimed in claim 1, wherein said optical system comprises a rotary sliding type two-dimensional actuator having at least two objective lenses, and the ½ wave plate is arranged closer to the light source of one of the objective lenses.

4. The optical information storage unit as claimed in claim 1, which further comprises:

two different magneto-optic signal detecting optical systems, one for reproducing the signal from the land and the other for reproducing the signal from the groove; and a movable mirror selecting one of the two magneto-optic signal detecting optical systems, said two magneto-optic signal detecting optical systems including means for giving mutually different phase compensation quantities.

5. The optical information storage unit as claimed in claim 4, wherein said means for giving the mutually different phase compensation quantities comprise crystal wave plates having refractive index anisotropies.

6. The optical information storage unit as claimed in claim 5, wherein:

the wave plate is made up of a ½ wave plate, in the two magneto-optic signal detecting optical systems the ½ wave plates have mutually different inclinations with respect to a propagating direction of the light beam, and orientation angles of crystal optical axes of the ½ wave plates with respect to an electrical vector of the incident light beam are different.

7. An optical information storage unit for reproducing information recorded on a magneto-optic recording medium having a land and a groove as recording tracks, comprising:

an optical system including a ½ wave plate which is arranged so that a crystal optical axis of the ½ wave plate and an electrical vector of a light beam emitted from a light source forms approximately 45 degrees, said ½ wave plate being movable so that another ½ wave plate can move to the position of the light so that a crystal optical axis of the other ½ wave plate is parallel to or perpendicular to the electrical vector, an electrical vector of the light beam irradiated on the magneto-optic recording medium being set so that the electrical vector is perpendicular to a direction in which a recorded signal flows when reproducing the signal from the land and is parallel to the direction in which the recorded signal flows when reproducing the signal from the groove.

8. The optical information storage unit as claimed in claim 7, wherein the ½ wave plate of said optical system is movable by a rotary sliding type actuator comprising a magnet and an electromagnetic coil.

9. The optical information storage unit as claimed in claim 7, wherein said optical system comprises a rotary sliding type two-dimensional actuator having at least two objective lenses, and one ½ wave plate is arranged closer to the light source of each of the two the objective lenses, and the ½ wave plates are positioned so that crystal optical axes thereof form 45 degrees to each other at a position where the light beam emitted from the light source transmits through the ½ wave plates.

10. The optical information storage unit as claimed in claim 7, which further comprises:

two different magneto-optic signal detecting optical systems, one for reproducing the signal from the land and the other for reproducing the signal from the groove; and a movable mirror selecting one of the two magneto-optic signal detecting optical systems, said two magneto-optic signal detecting optical systems including means for giving mutually different phase compensation quantities.

11. The optical information storage unit as claimed in claim 10, wherein said means for giving the mutually different phase compensation quantities comprise crystal wave plates having refractive index anisotropies.

12. The optical information storage unit as claimed in claim 11, wherein:

the wave plates are made up of ½ wave plates, in the two magneto-optic signal detecting optical systems the ½ wave plates have mutually different inclinations with respect to a propagating direction of the light beam, and orientation angles of crystal optical axes of the ½ wave plates with respect to an electrical vector of the incident light beam are different.

13. An optical information storage unit for reproducing information recorded on a magneto-optic recording medium having a land and a groove as recording tracks, comprising:

at least one of first means and second means, said first means including a ½ wave plate which is arranged so that a crystal optical axis of the ½ wave plate and an electrical vector of a light beam emitted from a light source forms approximately 45 degrees, said ½ wave plate being removable from a position of the light beam, said second means being arranged with the ½ wave plate so that the crystal optical axis of the ½ wave plate and the electrical vector of the light beam emitted from the light source forms approximately 45 degrees, said ½ wave plate being movable so that another ½ wave plate can move to the position of the light beam so that a crystal optical axis of the other ½ wave plate is parallel to or perpendicular to the electrical vector, an electrical vector of the light beam irradiated on the magneto-optic recording medium being set so that the electrical vector is perpendicular to a direction in which a recorded signal flows when reproducing the signal from the land and is parallel to the direction in which the recorded signal flows when reproducing the signal from the groove.

* * * * *